United States Patent
Feng-Jung

(10) Patent No.: US 6,191,553 B1
(45) Date of Patent: Feb. 20, 2001

(54) PORTABLE CHARGER WITH A SEPARATE BASE AND MOUNT WITH A BELT CLIP ATTACHMENT

(76) Inventor: Tu Feng-Jung, P.O. Box 82-144, Taipei (TW)

( * ) Notice: Under 35 U.S.C. 154(b), the term of this patent shall be extended for 0 days.

(21) Appl. No.: 09/139,404

(22) Filed: Aug. 25, 1998

(51) Int. Cl.[7] ............................... H02J 7/00; H01R 13/44
(52) U.S. Cl. ........................ 320/113; 320/111; 320/114; 439/131; 439/171
(58) Field of Search .................................. 320/111, 113, 320/114; 439/131, 170, 171, 172; D13/107, 108

(56) References Cited

U.S. PATENT DOCUMENTS

| | | | |
|---|---|---|---|
| 5,611,701 | * 3/1997 | Hahn | 439/131 |
| 5,628,641 | * 5/1997 | Hahn | 439/131 |
| 5,648,712 | * 7/1997 | Hahn | 320/111 |
| 5,838,554 | * 11/1998 | Lanni | 363/21 |
| 5,847,541 | * 12/1998 | Hahn | 320/111 |

* cited by examiner

*Primary Examiner*—Edward H. Tso
*Assistant Examiner*—Gregory J Toatley, Jr.
(74) *Attorney, Agent, or Firm*—A & J

(57) ABSTRACT

A portable charger, and particularly a portable charger for a mobile phone, includes a charger base having a reduced housing, an attaching mount, and a concealed plug. The charger base is provided with a pair of slide hooks, power contacts, stops, and an indicating light on a front side thereof. The attaching mount and the concealed plug are both provided on a back side of the charger base. The attaching mount is provided at an upper end of the back side of the charger base and adapted to be attached to abelt of a user. The concealed plug is capable of being movably pulled out about an angle of 90 degrees to be inserted into an electrical socket for recharging purposes.

1 Claim, 2 Drawing Sheets

1

PORTABLE CHARGER WITH A SEPARATE BASE AND MOUNT WITH A BELT CLIP ATTACHMENT

BACKGROUND OF THE INVENTION

1. Field of the Invention

The present invention relates generally to a charger, and more particularly to a portable charger for a mobile phone which can be attached to the belt of a user.

2. Description of the Prior Art

A conventional cellular phone charger includes an electrical socket, wires, an adapter, and a charger base. Such a charger is too large in size to be hand-carried by the user and has to be carried in a suitcase or bag.

SUMMARY OF THE INVENTION

The present invention relates generally to a charger, and more particularly to a portable charger for a mobile phone which can be attached to the belt of a user.

A primary object of the present invention is to provide a charger of a reduced size and having a reduced circuitry. The charger cooperates with an attaching mount and a concealed plug so that it may be conveniently carried around by the user.

According to an aspect of the present invention, the charger may match batteries of different brands and may be used in conjunction with a fitting base to facilitate charging.

According to another aspect of the present invention, the charger may be used as an alarm device which, when placed along with the corresponding mobile phone apart from the user, will emit sounds to remind the user to fetch it and the mobile phone to avoid loss.

According to a further aspect of the present invention, the charger may be used in conjunction with a fitting base to adapt to batteries of different brands. The fitting base may be configured to have a double charging function, that is, when a single battery is being recharged, another battery attached to the mobile phone may also be recharged.

According to still another aspect of the present invention, the charger comprises a charger base having a reduced housing, an attaching mount, and a concealed plug. The charger base is provided with a pair of slide hooks, power contacts, stops, and an indicating light on a front side thereof. The attaching mount and the concealed plug are both provided on a back side of the charger base. The attaching mount is provided at an upper end of the back side of the charger base and adapted to be attached to a belt of a user. The concealed plug is capable of being movably pulled out about an angle of 90 degrees to be inserted into an electrical socket.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1A:
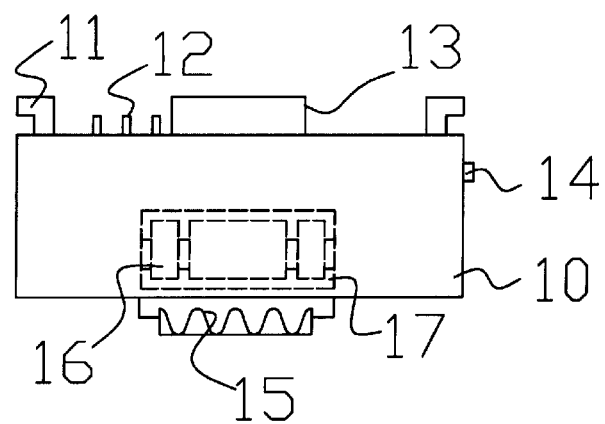
FIG. 1A is a top perspective view of a charger base of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 1B:
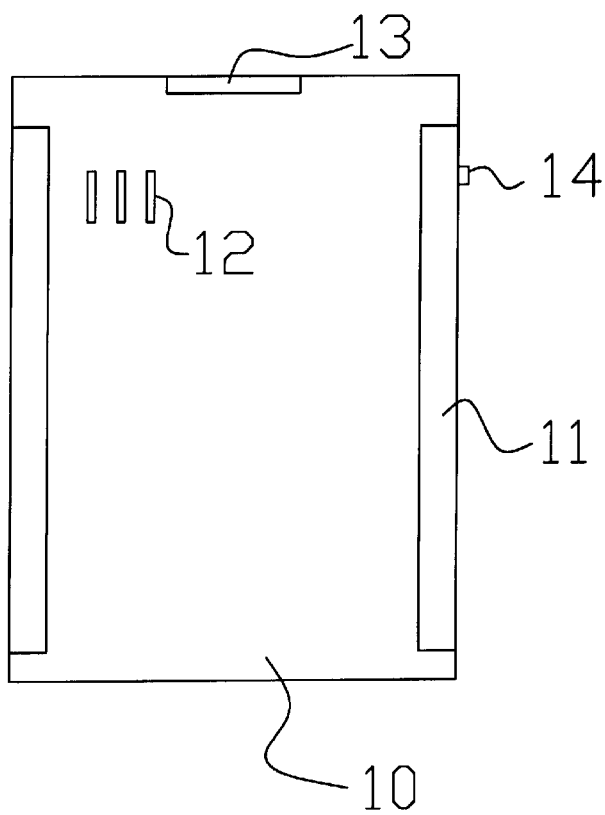
FIG. 1B is a front elevation of the charger base of FIG. 1A.

Referring to FIG. 1, a charger base 10 of the present invention includes a pair of slide hooks 11, power contacts 12, stops 13, and an indicating light 14. A back side of the charger base 10 is provided with an attaching mount 15 and a concealed plug 16. The attaching mount 15 is provided at an upper end of the back side of the charger base 10 to be adapted to attach to the user's belt. The concealed plug 16 may be movably pulled out or pushed into a groove 17 pre-formed on the back side of the charger base 10 to facilitate carrying and insertion into a power socket for recharging.

Figure 2A:
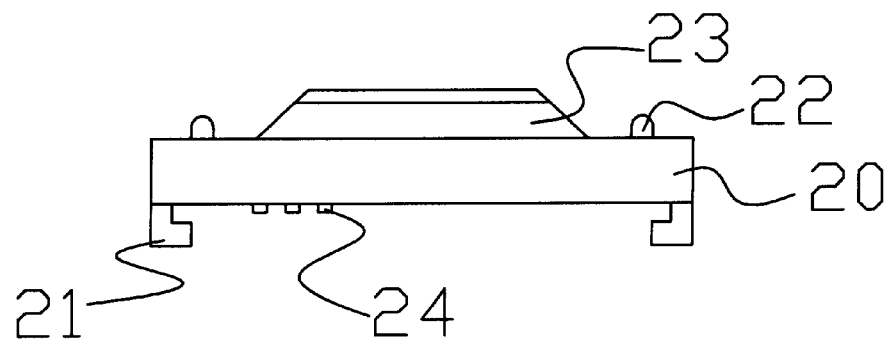
FIG. 2A is a top view of a fitting base of the present invention.
Figure 2B:
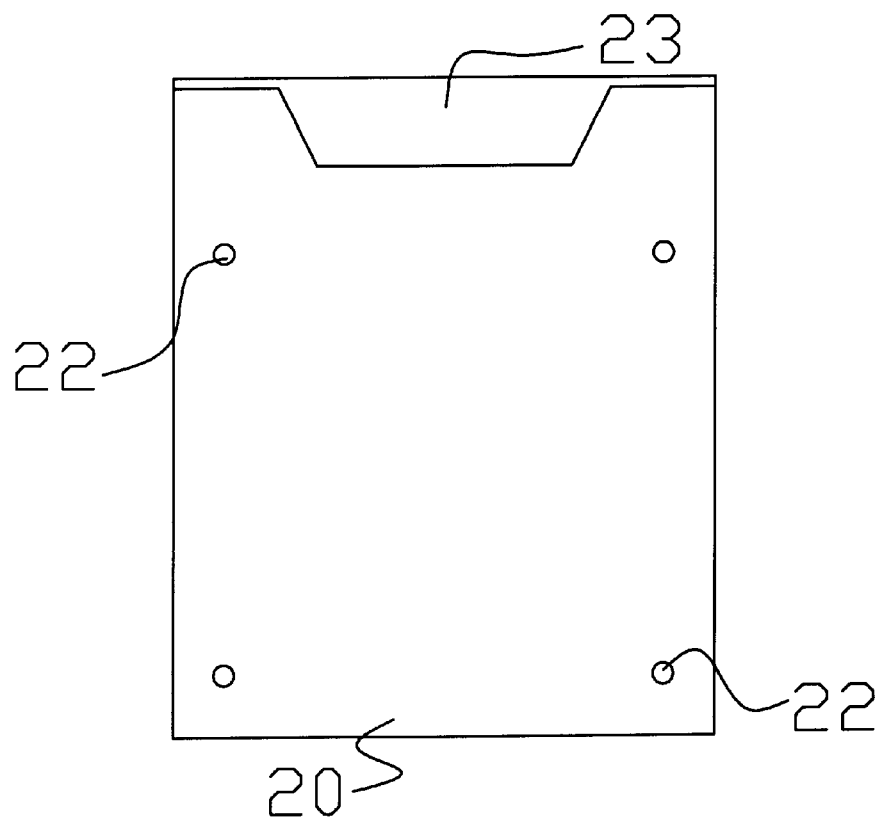
FIG. 2B is a front elevation of the fitting base of FIG. 2A.

Referring to FIG. 2, a fitting base 20 includes a pair of slide hooks 21 and a plurality of contacts 24 at its back side such that the fitting base 20 may couple to the charger base 10 with the slide hooks 21 engaging the slide hooks 11 and the contacts 24 connecting the power contacts 12, whereby electricity is connected to power contacts 22 of the fitting base 20 via circuits inside the fitting base 20. The stop 13 serves to limit the displacement of the fitting base 20 on the charger base 10. In addition, the fitting base 20 is provided with a stop 23 having a "úw" shape at an upper end of its front side adapted to be insertably fastened to one end of the battery. Furthermore, the four corners of the fitting base 20 are selectively provided with power contacts 22. In this way, the present invention may suit mobile phones of different brands.

It can be appreciated from the above that the charger base 10 of the present invention is compact and convenient to carry around. Besides, working in conjunction with an automatic switching circuitry and an external fitting base, it may adapt to different voltages and socket specifications.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A portable charger, comprising a charger base having a reduced housing, an attaching mount, and a concealed plug, wherein said charger base is provided with a pair of slide hooks, power contacts, stops, and an indicating light on a front side thereof, said attaching mount and said concealed plug being both provided on a back side thereof, said attaching mount being provided at an upper end of the back side of said charger base and adapted to be attached to a belt of a user; said concealed plug being capable of being movably pulled out about an angle of 90 degrees to be inserted into an electrical socket for recharging purposes.

* * * * *